(No Model.)
C. W. SALADEE.
WAGON GEAR.
No. 379,417. Patented Mar. 13, 1888.
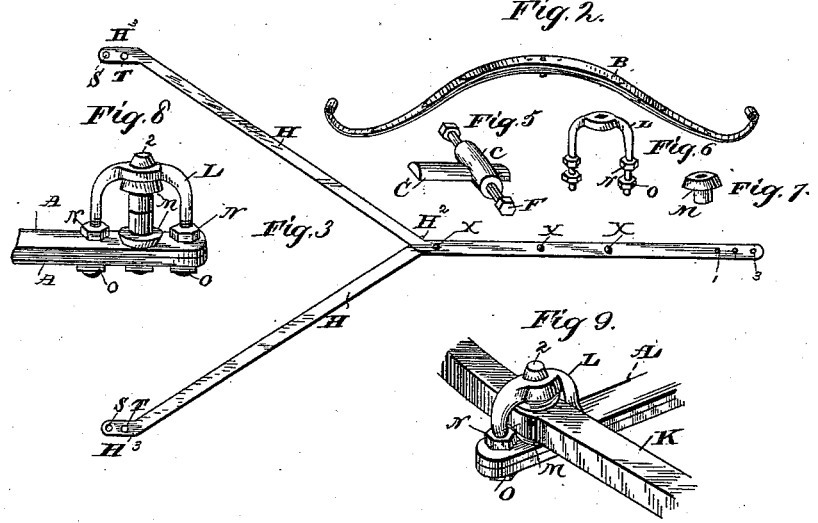
WITNESSES:
INVENTOR.

UNITED STATES PATENT OFFICE.

CHARLES W. SALADEE, OF FREEPORT, ILLINOIS, ASSIGNOR TO CYRUS W. SALADEE, OF CLEVELAND, OHIO.

WAGON-GEAR.

SPECIFICATION forming part of Letters Patent No. 379,417, dated March 13, 1888.

Application filed May 11, 1887. Serial No. 237,865. (No model.)

*To all whom it may concern:*

Be it known that I, CHARLES W. SALADEE, a resident of Freeport, in the county of Stephenson and State of Illinois, have invented certain new and useful Improvements in Wagon-Gears; and I do hereby declare the following to be a full, clear, and exact description of the invention, such as will enable others skilled in the art to which it pertains to make and use the same.

This invention relates to the running gear of road-wagons; and it consists in the construction and novel arrangement of devices, as hereinafter set forth, and pointed out in the appended claims.

In the drawings, Figure 1 is a perspective view of the complete wagon-gear embracing the several features of my invention. Fig. 2 is a detached view of one of the springs seen in Fig. 1. Fig. 3 is a detached plan view of the spring-reach seen in Fig. 1. Figs. 5, 6, 7, 8, 9, 10, and 11 are detached views of other parts seen in Fig. 1, and which will be more fully described below.

The axles J and K are made, preferably, of the form seen in Fig. 1. Next the shoulders and on the top of the axles is secured, by clips or otherwise, the trunnion-plates C, a detached view of which is seen in Fig. 5, and which consists of the hollow spool $c$, integral with the base-plate $c'$. Through this spool $c$ is passed the trunnion-bolt F, which engages the terminal ends of the springs B, as seen in Fig. 1, but more fully shown in Figs. 10 and 11. The springs are of the self-compensating form, terminating in ends without scrolls and conforming substantially to the shape seen in Fig. 2. The springs B are arranged parallel to and on opposite sides of the axle, and have their terminal eyes suspended from the trunnion-bolt F without links, as clearly shown in Figs. 1, 10, and 11. A fifth-wheel, P, is secured to the front pair of springs in any of the well-known modes of applying the same, as seen in Fig. 1. On the top of this fifth-wheel in front and the springs behind is secured the usual spring-bars whereon to support the body. In this instance I connect the front and rear axles by a spring-reach, H, which is made, preferably, of two plates of spring-steel, say, one and one-half by one-fourth inch of requisite length.

These plates H H overlie each other from the front end to about their center portions at $H^2$, Fig. 3; thence extending in opposite diagonal directions to $H^3$ $H^3$, terminating with holes $s$ T, as shown. The straight overlying front halves of these plates are held together by the bolts or rivets X, and through the front ends are made the holes 1, 2, and 3, by which latter they are secured to the front axle by means of the yoke L, a detached view of which is seen in Figs. 6 and 8, and shown in Fig. 1. The center portion of the front axle is enlarged and a hole made through it to receive from opposite sides the hollow spools M, Fig. 7, and same shown in Figs. 8 and 9. The yoke L is now passed over the top of the axle, and its prongs enter the holes 1 and 3 in the front end of the reach, and the whole is firmly held together by the set-nuts N O and the center bolt, 2. The rear ends of this reach connect to the axle, as seen in Fig. 1 and more fully shown in Fig. 11, where it is rigidly held by the clip 4. In Fig. 10 is shown the shaft-coupling D, which latter is made to serve the additional purpose of a clip, whereby to secure the inner end of the trunnion-plate $c'$ to the top of the axle.

I make no claim, broadly, to the application of duplex springs arranged parallel to and on opposite sides of the axle in road-wagons, as that is an old device and well known in the trade; neither do I claim, broadly, a spring-reach, since that is common in many classes of vehicles. So far as I know, however, the combination of such duplex springs with a spring-reach connecting the axles is new, and it presents decided advantages over any structure in which either of these elements is dissociated from the other. I have found in practice that where the duplex springs are used, the body being supported on and fastened to the front and rear platforms afforded by the central parts of the springs, any unequal loading of the body produces an unequal depression of the springs, tends to rotate the axle bearing the greater portion of the load, and consequently to bend upward the central portion of the reach. The rotative force applied to the axle is transmitted to the reach through the coupling connecting the reach and axle, and when a rigid reach is used the strain on the coupling has no relief, and the coupling therefore soon gives way and loosens or breaks. The use of a spring-reach, however, affords a cushion which takes up and distributes the strain on the coupling, and thus adds greatly to the durability of the structure without increasing its cost.

Having thus described my invention, what I claim, and desire to secure by Letters Patent, is—

1. In a road-wagon, the combination of an axle and springs parallel to and on opposite sides of the same, each rising at the center and connected at the ends to bearings arranged transversely to and on opposite sides of the axle, and a spring-reach consisting of two flexion members united at or about their center portion, thence extending the united parts to connect with the front axle, and the rear ends of said members being diagonally extended to unite with the hind axle at widely-separated points, substantially as set forth.

2. The combination, with the front end of the reach H and the axle, of the yoke L, locknuts N O, intermediate spools, M, and the center bolt, 2, all constructed and arranged to operate substantially as and for the purpose set forth.

In testimony whereof I have signed this specification in the presence of two subscribing witnesses.

CHARLES W. SALADEE.

Witnesses:
M. STORKOPF,
LEONARD STORKOPF.